Oct. 20, 1970
D. STITES
3,535,042
OPTICAL GAGE
Filed Jan. 5, 1968
2 Sheets-Sheet 1
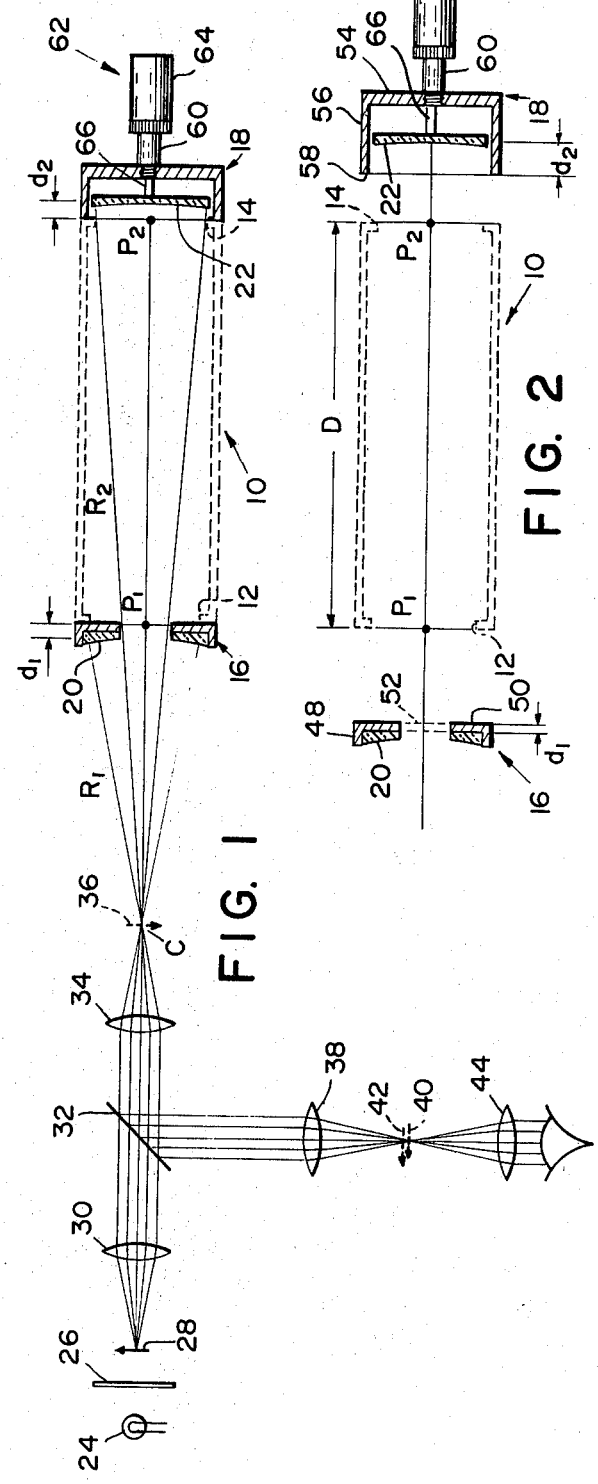
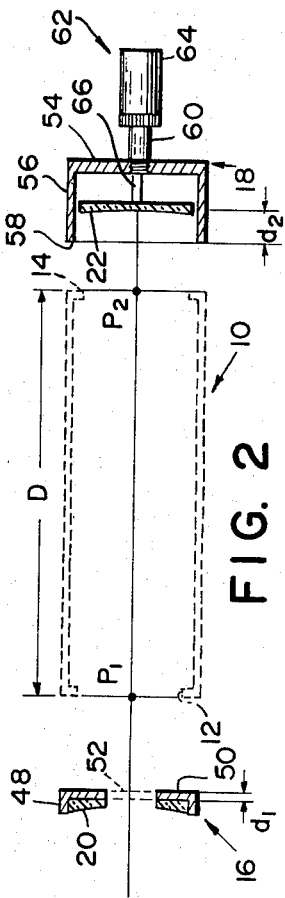
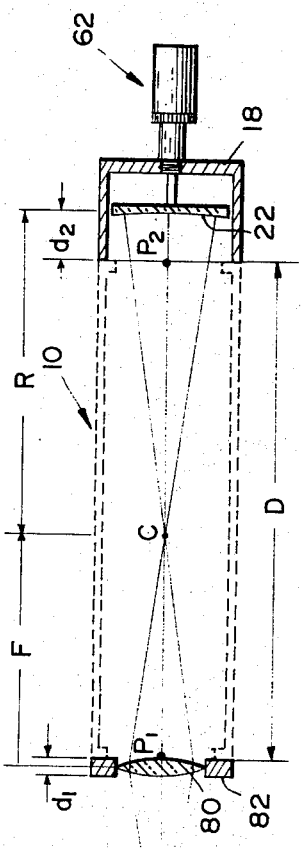
INVENTORS
DAVID STITES
WILLIAM D. MOGEY
BY Martin J. O'Donnell
ATTORNEYS INVENTORS
DAVID STITES
WILLIAM D. MOGEY
BY
Martin J. O'Donnell
ATTORNEYS

United States Patent Office 3,535,042
Patented Oct. 20, 1970

---

3,535,042
OPTICAL GAGE
David Stites, Woburn, and William D. Mogey, Cambridge, Mass., assignors to Itek Corporation, Lexington, Mass., a corporation of Delaware
Filed Jan. 5, 1968, Ser. No. 695,939
Int. Cl. G01b *11/14*
U.S. Cl. 356—156                                           13 Claims

ABSTRACT OF THE DISCLOSURE

The distance between two points in space, within an enclosure, is determined by positioning two spherical, concave reflecting mirrors in proximity to the points in question and at known distances from them. One of these mirrors is fixed in position; the other is movable along the path joining the points. A reference image is projected simultaneously onto both mirrors, and the position of the movable mirror with respect to its associated point is adjusted until the return images formed by both mirrors are both brought into focus as observed in an auxiliary viewer. When this occurs, the centers of curvature of the mirrors coincide and the distance between the points in question is determined from the known radii of curvature and the amount of adjustment of the movable mirror. A calibrated holder having a micrometer for adjusting the position of the movable mirror is used to measure the exact amount of this adjustment.

---

In another embodiment of the invention, a lens of known focal length is employed in lieu of the first mirror, and the reference image is projected through the lens to form a first image which is merged with a second image reflected from the spherical mirror.

The invention is especially useful for measuring the distance between two points along a folded optical path joining the points.

The invention is accordingly drawn to a method of accurately measuring the distance between two points in space along a given optical path comprising the steps of positioning a pair of focusing optical elements of known focal length adjacent the respective points and at a predetermined distance from them, projecting an image along the optical path for focusing by elements simultaneously, forming a return image corresponding to the projected image with the aid of the optical elements, and adjusting the position of at least one of the optical elements along the path a measured amount in accordance with the return image until the optical elements are positioned a precisely known distance from each other whereby the distance between the points may accurately be determined from the known focal lengths of the optical elements and their positioning with respect to the respective points. The invention is also directed to apparatus for performing the above measurement and comprising first and second focusing optical elements having a precisely defined geometric length associated with each element, the elements being positionable adjacent the points whose separation is to be measured, means for projecting light rays to the elements along the optical path joining the points, the elements being adapted to return a portion of the projected light back along the path, means for observing the returned light, and means for adjusting the position of at least one of the elements a precisely measureable amount along the path to obtain a predetermined relation between the optical lengths as determined from the returned light whereby the distance between the points may be determined from the known geometric lengths and the positioning of the elements with respect to the respective points.

BACKGROUND OF THE INVENTION (a) Field of the invention

The invention relates to measuring instruments and techniques, and more particularly, to optical measuring instruments and techniques for precisely determining the separation between two relatively inaccessible points in space.

(b) Prior art

The most common type of instrument for measuring the distance between two points is a mechanical gage which is first extended between the points whose separation is to be measured and is then compared with a calibrated scale to determine the separation. When the separated points are intangible, and are merely loci in space, mechanical gages are impractical. Further, when the distance between two such points is relatively large, gages of this type are often awkward to handle and are difficult to maintain in fixed relation with respect to the loci of the points whose separation is to be measured. Further, such gages generally are not adapted to the determination of the distance between two points in space along a path which has one or more bends in it. Paths of this type are often encountered in optical instruments and in microwave apparatus and are known as "folded" paths.

Optical instruments have also previously been used to measure the distance between two points lying along either straight or folded paths. Such instruments generally provide a greater accuracy than that obtainable with mechanical gages but heretofore have been either expensive or delicate in nature and time-consuming to set up and use.

In view of the disadvantages of measuring instruments as outlined above, a trial-and-error technique is often used to measure the distance between two points or to precisely position parts with respect to each other. Such techniques are often unduly time-consuming since they generally require repeated adjustments until the parts are positioned with the desired accuracy.

SUMMARY OF THE INVENTION

The invention makes use of the fact that the distance between two reference points on a pair of spherical concave, reflecting mirrors of known but unequal radii is a known quantity when the centers of curvature of the mirrors coincide.

In accordance with this principle, we position two spherical concave, reflecting mirrors adjacent the points whose separation is to be measured, each point being a known distance from a reference point (conveniently, the vertex) on the corresponding mirror. A reference image is projected simultaneously onto both mirrors and the position of one of the mirrors with respect to its associated point is adjusted along the path joining the points until the return images from the mirrors are brought to a focus in a common plane. When this occurs, the centers of curvature of the two mirrors coincide and the vertices of the mirrors are separated by a precisely-known distance, i.e. by the difference between their radii. The distances between the mirror vertices and their associated points, together with the amount of adjustment of the movable mirror, are then added to, or subtracted from, the known radii to determine the distance between the points themselves.

When the path between the points to be measured contains one or more bends, i.e. is folded, one or more plane reflecting mirrors are positioned along the path at the bends to direct the illuminating light onto the distant spherical mirror normal to its surface and to return the reflected image toward the common center of curvature of the spherical mirrors. Effectively, the plane mirrors straighten the folded optical path between the mirrors into its straight line equivalent and the measurement proceeds as previously.

In order to rapidly and easily position the spherical mirrors in the appropriate optical alignment, we provide for each such mirror a mounting structure that is particularly adapted to carry out the measurements. The mounting structure associated with the movable spherical mirror contains an integrally-mounted micrometer for precisely adjusting the position of the mirror with respect to the point with which it is associated.

The invention is especially useful in optical instruments which typically have one or more pairs of folded axes forming an optical path whose length must be determined with great precision. In such cases, production-line measurements are greatly simplified by the invention. The invention is also particularly adapted for use in the measurement of waveguide structures where the length of the structure along a folded path must be determined with great accuracy.

This invention permits mechanical parts to be inspected where the specified dimensions are related to intangible points of reference such as centerlines and points of rotation or line intersections which lie at the center of, or depend upon tangible geometry inherent in the item being inspected.

The invention accordingly comprises the several steps and the relation of one or more of such steps with respect to each of the others, and the apparatus embodying the features of construction, combinations of elements and arrangement of parts which are adapted to effect such steps, all as exemplified in the following detailed disclosure. The scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a schematic diagram, partly in section, of one embodiment of the invention showing a straight cylindrical tube whose length is to be measured in accordance with the invention;

FIG. 2 is a schematic diagram, partly in section, of the tube and mirorrs of FIG. 1 and showing the mirrors separated from the tube for clarity of explanation;

FIG. 4 is a schematic diagram of an alternative embodiment of the invention in which one of the mirrors of the invention is replaced by a lens.

SPECIFIC DESCRIPTION OF THE INVENTION

Figure 3:
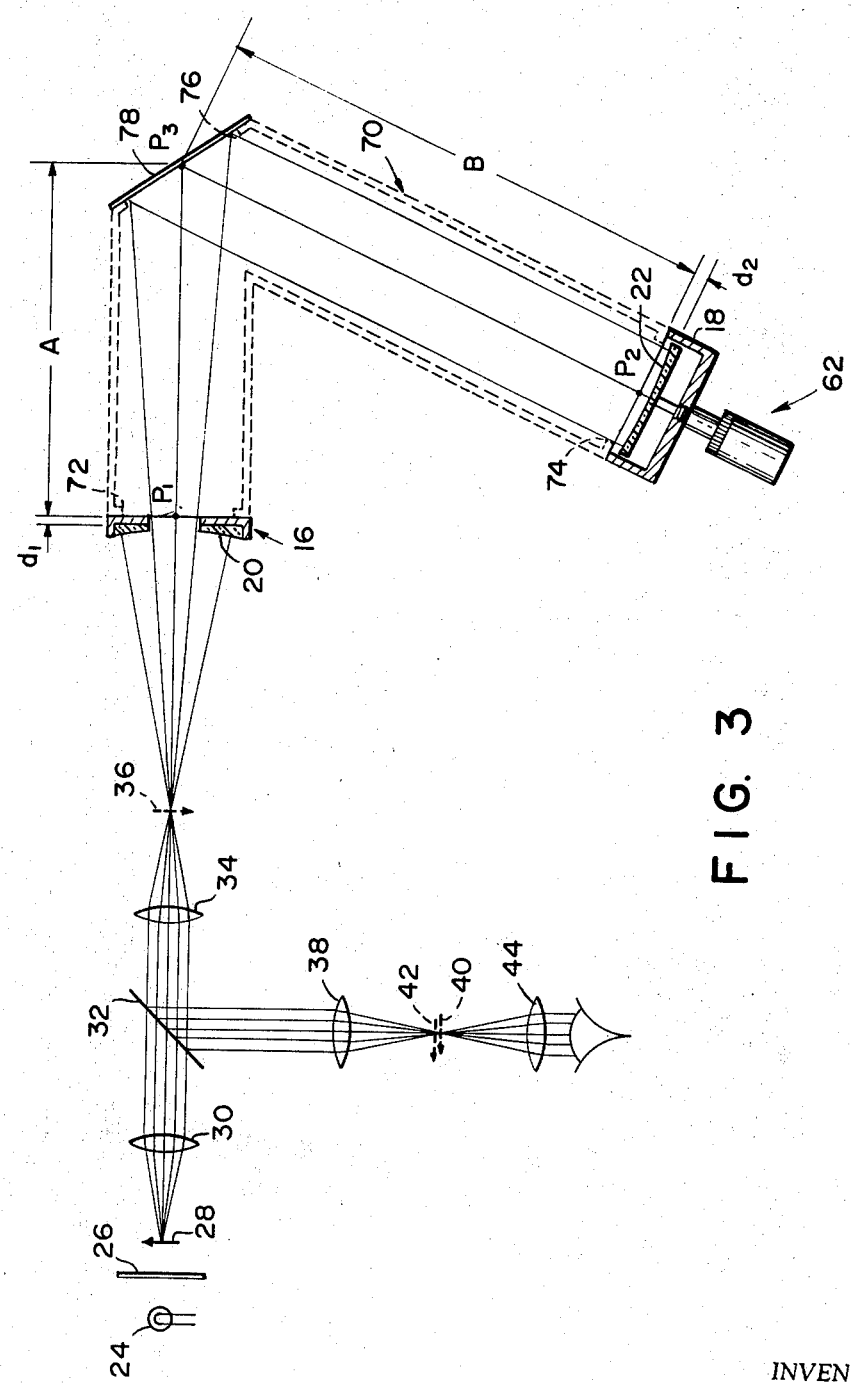
FIG. 3 is a schematic diagram of a folded cylindrical tube whose length along a folded path extending between the end walls is to be measured in accordance with the invention.

FIG. 1 is a side view, partly in section, of a cylindrical open-ended tube 10 (shown in dotted lines) which is used to demonstrate the invention, together with optical apparatus for measuring its length. For purposes of illustration, the tube 10 has flanges 12 and 14 defining the planes of a pair of planar end walls containing points $P_1$ and $P_2$, respectively, whose separation D along the straight-line axial path joining the points is to be determined. The points $P_1$ and $P_2$ are located at the intersection of the centerline of the tube 10 with the planes of the respective end walls. The points are, of course, intangible, in that they exist only in space and are not located on a physical object. These points do, however, define a physically meaningful distance D whose magnitude is to be determined; for example, the tube 10 may form part of an optical instrument and the distance D then corresponds to the length of the optical path traversed by a light ray travelling through the tube.

A pair of mirror holders 16 and 18 containing reflecting mirrors 20 and 22, respectively, are butted against the respective end walls of the tube. The holders 16 and 18 are separated from the tube 10 as will be seen more clearly in FIG. 2. The mirror 20 has a radius of curvature $R_1$ centered at C, while the mirror 22 has a radius of curvature $R_2$ centered at, or near, C. The mirrors 20 and 22 are illuminated by light from a source 24 passing through a diffusing screen 26 to illuminate a reticle 28 (represented here by a vertical arrow). The image of the reticle is projected through a lens 30, a half-silvered mirror 32, and a lens 34 to form an image 36 which is projected onto the mirrors 20 and 22. The reflected rays from the mirrors 20 and 22 are returned through the lens 34 onto the mirror 32 and are then reflected into a lens 38 which focuses these rays to form images 40 and 42 respectively. For reasons which will be explained below, these images are shown slightly displaced from one another. A lens 44 collimates this light for viewing by the eye of an observer placed behind the lens. Alternatively, an additional lens may be aligned with the lens 44 for focusing the collimated light onto a photoreceptor. Effectively, the lenses 38 and 44 form a viewing microscope.

For purposes of explanation, the mirrors are shown separated from the tube 10 in FIG. 2. The holder 16 is in the form of a relatively short cylindrical tube having a side wall 48 and a planar end wall 50. The end wall 50 has a central aperture 52 extending through it; the mirror 20 is firmly mounted (by adhesives or other means) within the interior of the tube 10 with its axis of symmetry coincident with the centerline of the holder. The mirror 20 has a central section removed corresponding to the aperture 52. The distance, measured along the centerline of the holder 16, from the plane of the end wall 50 to the vertex of the mirror 20 (the vertex here being defined as the point at which the mirror surface would intersect the centerline of the holder 16 were it extended to that line) is a precisely known quantity and is designated as $d_1$ in FIG. 2.

The holder 18 is also in the form of a relatively short cylindrical tube and has an end wall 54 and a side wall 56 having an end face 58; the plane of the end face is perpendicular to the centerline of the holder 18. The end wall 54 has a central threaded aperture extending through it for receiving a threaded barrel 60 of a micrometer 62 having a handle 64 and a probe 66 connected to the mirror 22. The probe 66 is movable inwardly and outwardly along the axis of the holder by means of the handle 64 to adjust the axial position of the mirror 22 within the holder. The micrometer is adjusted to have a zero reading when the vertex of the mirror 22 (the vertex here being defined as the intersection of the mirror surface with the centerline of the holder) is located at a precisely known distance from the intersection of the plane of the end face 58 with the tube centerline. This distance is designated as $d_2$ in FIG. 2.

Referring back to FIG. 1, the holders 16 and 18 are butted firmly against the respective end walls of the tube 10 and are held there by clamps or other means (not shown) so that the points $p_1$ and $p_2$, which lie in the planes defined by the respective end walls of the tube 10, are accurately located with respect to the vertices of the mirrors 20 and 22 respectively. Measurements are made as follows: the image of the reticle 28 is projected onto the mirror 20 and the microscope viewer comprising the lenses 38 and 44 is adjusted to bring the return image 40 into focus. The mirror 22 may be removed during this step to preclude formation of the return image 42 so that the image 40 may be viewed clearly and unmistakably. This establishes an initial reference for the measurement.

The image of the reticle is next projected onto both the mirrors 20 and 22 and the return images are viewed through the microscope. If the centers of curvature of these mirrors coincide, the return images 40 and 42 lie in the same planes as observed through the viewing microscope. When this occurs, the distance D in FIG. 1 is given by $$D = R_2 - (R_1 + d_1 + d_2)$$

Since each of the quantities on the right side of the equation is a known quantity, the distance D is readily computed.

More generally, however, the centers of curvature of the mirrors do not coincide. Consequently, the return image 42 formed by the mirror 22 is displaced from image 40 formed by the mirror 20 and accordingly is out of focus as seen through the viewing microscope; this is the situation depicted in FIG. 1. When this occurs, the position of the mirror 22 must be adjusted to obtain the desired coincidence of the mirror centers of curvature. This is done by adjusting the micrometer 62 to move the mirror 22 to the right or left along the axis joining the points $P_1$ and $P_2$ until the return images are both brought into focus in a common plane. At this time, the distance D between the points $P_1$ and $P_2$ is given by $$D = R_2 - (R_1 + d_1 + d_2) \pm m$$

where $m$ is the micrometer reading giving the amount of adjustment made in the position of the mirror 22. Thus, the distance D may readily be calculated.

Of course, the entire return image of the reticle need not be viewed to establish the desired alignment of the mirrors. It will suffice to observe the central portion of the return images only, a displacement of these portions serving to indicate the misalignment in the mirrors. In this case, electronic focal sensing in which the movable mirror is adjusted until the intensity of the central portions of the return images is found to be a maximum may advantageously be utilized.

The apparatus of FIG. 1 is restricted in its measurements to distances whose magnitudes are within the range $R_2 \pm m$. In order to measure a wider range of distances, therefore, it is necessary to provide a number of mirrors 22 of different radii, each mirror thus being suitable for measuring distances lying between the limits $R_2 \pm m$. The measuring apparatus will thus be found most useful for production-line applications, where the length of the instrument being measured varies only slightly from piece to piece so that only a single adjustable mirror 22 need be used with the mirror 20.

In FIG. 1, the lenses 30 and 34 have equal focal lengths and the reticle 28 is placed in the focal plane of the lens 30. This causes the image 36 to be formed without magnification in the focal plane of the lens 34. The lenses 30 and 34 effectively constitute a relay system for transposing an image in space from one location to another and allows the positioning of the reticle image at a convenient location for projection onto the mirrors 20 and 22 while facilitating the viewing of the return images by means of a viewing microscope. Preferably, the focal plane containing the image 36 is located at the center of curvature of the mirror 20 (and thus at the center of curvature of the mirror 22 when these are aligned). This ensures that the light rays from the image 36 impinge upon the mirrors 20 and 22 at relatively small angles and accordingly most of the reflected rays will be returned through the lens 34 and imaged by the lens 38. The measuring process will be further improved by maintaining the reticle 28 and its image 36 relatively small in comparison to the focal length of the lens 30 so that the rays from this image are essentially collimated; this prevents problems otherwise caused by spherical aberration of the mirrors.

The apparatus of FIG. 1 is especially useful for determining the distance between two points lying on folded optical paths. In this case, the distance between the points is not readily measurable with conventional mechanical gages. FIG. 3 is a schematic diagram illustrating the positioning of the measuring apparatus in accordance with the invention when measurements along a folded path are to be made.

A folded cylindrical tube 70 whose central length is to be measured has end flanges 72 and 74 forming planar end walls against which the mirror holders 16 and 18 containing mirrors 20 and 22 respectively are butted. An intermediate wall is formed by flange 76 against which a planar, reflecting mirror 78 is butted. The end walls formed by the flanges 72 and 74 contain midpoints $P_1$ and $P_2$ whose separation D along a folded path joining the points is to be measured. This path extends from the point $P_1$ along a straight line to a point $P_3$ at the midpoint of the wall formed by the flange 76 and thence along a straight line to the point $P_2$. The desired distance D is then given by $D = A + B$, where A and B are the straight-line distances between the points $P_1$ and $P_3$ and $P_3$ and $P_2$, respectively.

As was the case in FIG. 1, the mirror holders 16 and 18 containing the mirrors 20 and 22, respectively, are butted against the respective end walls of the tube. The usual illuminating source 24 projects the image of the reticle 28 through the lenses 30 and 34 and the half-silvered mirror 32 onto the mirrors 20 and 22. The rays reflected from these mirrors are returned to the mirror 32 and thence brought to a focus by the lens 38. The resultant image is viewed through the lens 44.

The operation of the apparatus of FIG. 3 is similar to that of FIG. 1. The image of the reticle 28 is first projected onto the mirror 20 and the viewing microscope is adjusted to focus on the return image 40 from the mirror. The image of the reticle is then projected onto both mirrors and the return images formed by these mirrors are observed. If both images are in focus, the centers of curvature of the mirrors coincide and the distance D is given by $$D = R_2 - (R_1 + d_1 + d_2)$$

If, however, both of the return images are not in focus as seen through the viewing microscope, the micrometer 62 is adjusted to move the mirror 22 an amount $m$ toward or away from the mirror 20 until the images are both brought into focus in a common plane and the centers of curvature coincide. The distance D is then given by $$D = R_2 - (R_1 + d_1 + d_2) \pm m$$

FIG. 4 shows another embodiment of measuring apparatus according to the invention in which one of the mirrors (e.g., the mirror 20) is replaced by a lens 80 mounted in a housing 82 butted against one end wall of the tube 10 being measured. The usual spherical mirror 22 mounted in housing 18 and having a micrometer 62 for adjustment of its axial position is butted against the other end wall of the flange. The lens 80 has a focal length F centered at C on the centerline of the tube, while the mirror 22 has a radius of curvature R centered near C. The image projection and viewing apparatus is the same as in FIG. 1 and is not shown in FIG. 4.

The apparatus of FIG. 4 may be initially calibrated in any of several ways. A preferred way of doing so is to position the projecting system so that a focal plane of the lens 34 coincides with a focal plane of the lens 80. When this is done, the return image formed by the mirror 22 will lie in a focal plane of the focusing lens 38 when the center of curvature of the mirror 22 lies at the point C coincident with the focal point of the lens 80. The viewing microscope may then be focused on the focal plane of the lens 38 and the coincidence of the mirror center of curvature and the focal plane of the lens 80 detected by adjusting the position of the mirror 22 until a sharp focus is obtained. The desired length D is then given by $$D = F + R - (d_1 + d_2) \pm m$$

where $d_1$ is the distance between the center of the lens 70 and the point $P_1$ and $d_2$ is the distance between the vertex of the mirror 22 and the point $P_2$.

The apparatus of FIG. 4 may also be used to measure the distance between two points lying along a folded axis joining the points. In this case, a mirror will be positioned at the bend in the axis as in FIG. 3 and the measurement will be made as previously.

Although the method and apparatus described above provide a precise measurement of the distance between the points in question, even greater precision may be obtained by replacing the focal sensing apparatus with interference-sensing apparatus, and directing coherent light from a laser beam simultaneously onto a reference mirror and onto the concave, spherical reflecting mirrors. The interference pattern obtained between the waves reflected from the reference mirror and those reflected from the spherical mirrors precisely determines the focal position for the spherical mirrors. The computations described above may then be performed to obtain the exact distance between the measurement points in question.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

We claim:

1. A method of accurately measuring the distance between two points in space along a given optical path joining the points comprising the steps of:
   (A) positioning a pair of curved reflecting mirrors of known curvature adjacent the respective points and at a predetermined distance therefrom,
   (B) illuminating the mirrors from a light source,
   (C) adjusting the position of one of the mirrors a precisely determinable amount along said path until the centers of curvature of the mirrors coincide as determined by the light reflected from the mirrors when the mirrors are illuminated from the source, and
   (D) accurately determining the distance between the points from the known radii of curvature of the mirrors, their positioning with respect to the points, and the amount of adjustment of said one of the mirrors.

2. The method defined in claim 1 in which the mirrors are concave with respect to the light source and wherein the centers of curvature of the mirrors are made coincident by projecting an image onto said mirrors and adjusting the position of one of said mirrors until the return images formed by the mirrors are both brought to focus in a common plane.

3. The method defined in claim 1 in which the mirrors are spherical, concave reflecting mirrors and further including the step of illuminating the mirrors by passing light through a lens having a focal plane containing the common center of curvature of said mirrors when said mirrors are aligned.

4. The method defined in claim 3 in which the central portion of the first mirror is removed and further including the step of illuminating the second mirror through said central portion.

5. The method defined in claim 4 and further including the step of choosing the difference between the radii of curvature of the mirrors to be approximately equal to the separation between the points to be measured.

6. The method defined in claim 5 in which the points lie on a folded optical path formed by first and second intersecting axes, respectively, and further including the steps of positioning the mirrors adjacent the corresponding points on the respective axes, and positioning a third reflecting mirror at the intersection of said axes for receiving light from said source and directing it to one of said mirrors.

7. A method of measuring the distance between two points along a folded path joining the points, comprising the steps of:
   (A) positioning a pair of spherical, concave reflecting mirrors of known curvature adjacent the points, such that
      (1) the vertices of the mirrors are positioned a precisely measurable distance from the points,
      (2) the centers of curvature of the mirrors are located approximately adjacent each other and along the path joining the points,
   (B) directing light from a source onto both mirrors,
   (C) observing the reflected light and adjusting the position of the mirrors with respect to each other a precisely determinable amount along said path until the centers of curvature are made coincident as determined from the light reflected from said mirrors, and
   (D) accurately determining the distance between the points from the known radii of curvature of the mirrors, their positioning with respect to the points, and the amount of adjustment of said one of the mirrors.

8. The method defined in claim 7 in which coincidence of the centers of curvature of said mirrors is obtained by projecting an image onto both mirrors by means of said light source and adjusting the relative position of the mirrors along the path joining them until the return images from the mirrors are brought into focus in a common plane.

9. The method defined in claim 8 and further including the step of focusing the return images at their common center of curvature when the centers are coincident.

10. A method of accurately measuring the distance between two points in space along a given optical path joining the points comprising the steps of:
    (A) positioning a pair of focusing optical elements, each having a precisely known optical length associated therewith, adjacent the respective points and at a predetermined distance therefrom,
    (B) projecting an image along said optical path for focusing by both optical elements simultaneously,
    (C) forming with said elements a return image corresponding to said projected image,
    (D) observing said return image and adjusting the position of at least one of said optical elements along said path a measured amount in accordance with said return image until said optical elements are positioned a precisely known distance from each other, and
    (E) accurately determining the distance between the points from the known optical lengths of the optical elements, their initial positioning with respect to the points and the amount of adjustment of said one of the optical elements.

11. The method defined in claim 10 in which one of said optical elements comprises a lens and the other of said optical elements comprises a spherical, concave reflecting mirror, and further including the step of adjusting the position of one of said elements along the optical path joining them until the center of curvature of the mirror coincides with a focal plane of the lens as determined from the return image formed by said elements.

12. The method defined in claim 11 in which the points to be measured lie on a folded optical path formed by first and second intersecting axes, respectively, and further including the steps of positioning the optical elements adjacent the corresponding points on the respective axes, and positioning a planar reflecting mirror at the intersection of said axes for receiving the projected image and directing it onto said mirror.

13. A method of accurately measuring the distance between two points in space along a given optical path joining the points comprising the steps of:
   (A) positioning one of a pair of focusing optical elements, each having a precisely known focal length associated therewith, adjacent each of the respective points,
   (B) projecting a fiducial mark along said optical path for focusing by each of the optical elements,
   (C) forming with said elements at least one returned fiducial mark from the projected fiducial mark, and
   (D) utilizing said at least one returned fiducial mark to accurately determine the distance between the points by correlating the known focal length of each element and the position of each element along said optical path relative to each point.

References Cited

UNITED STATES PATENTS 2,466,015  4/1949  Ewing _____ 356—158

RONALD L. WIBERT, Primary Examiner

J. ROTHENBERG, Assistant Examiner

U.S. Cl. X.R.

33—125; 350—294